United States Patent
Trombetta et al.

(10) Patent No.: US 9,498,717 B2
(45) Date of Patent: Nov. 22, 2016

(54) COMPUTING APPLICATION INSTANT REPLAY

(71) Applicant: Microsoft Technology Licensing, LLC, Redmond, WA (US)

(72) Inventors: Steven Trombetta, Seattle, WA (US); Edmund Samuel Victor Pinto, Duvall, WA (US); Todd Ryun Manion, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 14/177,120

(22) Filed: Feb. 10, 2014

(65) Prior Publication Data

US 2015/0224395 A1   Aug. 13, 2015

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/497 | (2014.01) | |
| G06F 3/14 | (2006.01) | |

(52) U.S. Cl.
CPC .............. *A63F 13/497* (2014.09); *G06F 3/14* (2013.01); *G06F 3/1454* (2013.01)

(58) Field of Classification Search
USPC .......................... 463/1, 7, 24, 36, 37, 43, 44
See application file for complete search history.

(56) References Cited

U.S. PATENT DOCUMENTS

| | | |
|---|---|---|
| 5,842,929 A | 12/1998 | Moody et al. |
| 6,674,447 B1 | 1/2004 | Chiang et al. |
| 6,699,127 B1* | 3/2004 | Lobb et al. ............... 463/43 |
| 7,502,545 B2 | 3/2009 | Affaki |
| 8,083,593 B2 | 12/2011 | White et al. |
| 9,005,033 B2 | 4/2015 | Figueroa |
| 2002/0190991 A1* | 12/2002 | Efran .................. H04N 5/2224 345/475 |

(Continued)

FOREIGN PATENT DOCUMENTS

WO    2014077455 A1    5/2014

OTHER PUBLICATIONS

"My Screen Recorder Pro (Plural Pages)", DeskShare, Available at: http://web.archive.org/web/20131124041309/http://www.deskshare.com/help/msrpro/index.aspx, Nov. 24, 2013, 12 pages.

(Continued)

*Primary Examiner* — Adetokunbo O Torimiro
(74) *Attorney, Agent, or Firm* — Gregg Wisdom; Judy Yee; Micky Minhas (57) ABSTRACT

Various embodiments relating to providing video game instant replays are disclosed. In one embodiment, a currently playing video game is overseen by a platform-level instant replay companion that executes separately from any of a plurality of different video games. A most recently played portion of rendered gameplay from the currently playing video game is automatically and continuously recorded with the platform-level instant replay companion. A recorded gameplay segment from the most recently played portion of rendered gameplay is displayed with the platform-level instant replay companion.

19 Claims, 6 Drawing Sheets

(56) References Cited

U.S. PATENT DOCUMENTS

| | | |
|---|---|---|
| 2007/0294089 A1 | 12/2007 | Garbow et al. |
| 2008/0005775 A1 | 1/2008 | Belton et al. |
| 2008/0119286 A1 | 5/2008 | Brunstetter et al. |
| 2009/0131177 A1 | 5/2009 | Pearce |
| 2012/0102373 A1 | 4/2012 | Waugh |
| 2012/0109813 A1 | 5/2012 | Buck |
| 2012/0134651 A1 | 5/2012 | Cottrell |
| 2013/0337916 A1 | 12/2013 | Saretto et al. |
| 2014/0179439 A1 | 6/2014 | Miura et al. |
| 2014/0274297 A1 | 9/2014 | Lewis et al. |

OTHER PUBLICATIONS

ISA European Patent Office, International Search Report and Written Opinion issued in Application No. PCT/US2015/014528, May 18, 2015, Netherlands, 11 Pages.

Hilliard, Kyle, "Microsoft Announces Twitch Partnership, Eliminates Microsoft Points for Xbox One", https://www.gameinformer.com/b/news/archive/2013/06/10/microsoft-details-online-announces-twitch-partnership-and-officially-abandons-microsoft-points-for-xbox-one.aspx, Jun. 10, 2013, 5 pages.

Honorof, Marshall, "How to Record and Edit Video on the PS4", http://www.tomsguide.com/us/record-edit-video-ps4,news-17900.html, Nov. 25, 2013, 6 pages.

Humphries, Matthew, "Xbox One Records Last 5 Minutes of Gameplay, Saves 30 Second Clips with a Voice Command", http://www.geek.com/games/xbox-one-records-last-5-minutes-of-gameplay-saves-30-second-clips-with-a-voice-command-1562942/, Jul. 22, 2013, 6 pages.

Lein, Adam Z., "SmartGlass for Xbox One Looks Like a Big Improvement", http://pocketnow.com/2013/11/19/smartglass-for-xbox-one-improvement, Nov. 19, 2013, 4 pages.

Orland, Kyle, "Sony Exec: Developers can Block PS4's Share Button Functions", http://arstechnica.com/gaming/2013/05/sony-exec-developers-can-block-ps4s-share-button-functions/, May 6, 2013, 2 pages.

Parreno, Ryan, "Should You Use Nvidia's Shadowplay Game Recording Feature?", http://www.gameranx.com/updates/id/18633/article/should-you-use-nvidia-s-shadowplay-game-recording-feature/, Nov. 11, 2013, 3 pages.

Prestia, Gaetano, "Xbox One DVR Guide: How to Record Your Game Footage", http://mmgn.com/xboxone/articles—xbox-one-dvr-guide-how-to-record-your-game-fo, Sep. 12, 2013, 5 pages.

"Record Android Gameplay Footage with SeeMeGaming", Google Android, http://www.phonesreview.co.uk/2012/03/22/record-android-gameplay-footage-with-seemegaming/, Mar. 22, 2012, 3 pages.

White, Joe, "Mobile Gameplay Recording Is Coming to Unreal Engine-Powered iOS Games", http://appadvice.com/appnn/2014/02/mobile-gameplay-recording-is-coming-to-unreal-engine-powered-ios-games, Feb. 5, 2014, 4 pages.

Medler, B., "Player Dossiers: Analyzing Gameplay Data as a Reward," International Journal of Computer Game Research, vol. 11, No. 1, Feb. 2011, 17 pages.

Yamabe, T. et al., "Prototyping Augmented Traditional Games: Concept, Design and Case Studies," Available Online at http://www.slideshare.net/beniyama/1-12184248, Mar. 27, 2012, 25 pages.

"Geforce ShadowPlay," Nvidia Website, Available Online at http://www.nvidia.in/object/geforce-experience-shadow-play-in.html, Available as early as Feb. 27, 2014, 3 pages.

"Save and Share PS4 Gameplay Videos," Playstation Knowledge Center Website, Available Online at https://support.us.playstation.com/app/answers/detail/a_id/5088/~/save-and-share-ps4-gameplay-videos, Updated Nov. 17, 2014, Accessed Jul. 28, 2015, 2 pages.

"How to Record GTA V Videos and Share Them on YouTube," NDTV Gadgets Website, Available Online at http://gadgets.ndtv.com/games/features/how-to-record-gta-v-videos-and-share-them-on-youtube-683813, Apr. 21, 2015, 6 pages.

Linn, D., "New Gameplay Recording and Editing Features in Raptr," Raptr Tracks Website, Available Online at http://blog.raptr.com/2015/05/05/new-gameplay-recording-and-editing-features-in-raptr/, Published May 5, 2015, 3 pages.

"How to Record and Share Your Gameplay," Nvidia Website, SHIELD Tablet User Guide, Available Online at http://support-shield.nvidia.com/tablet-user-guide/index.htm#t=how-to-record-and-share-your-gameplay.htm, Accessed Jul. 30, 2015, 1 page.

IPEA European Patent Office, Written Opinion of the International Preliminary Examining Authority Issued in Application No. PCT/US2015/014528, Jan. 5, 2016, WIPO, 8 pages.

IPEA European Patent Office, International Preliminary Report on Patentability Issued in Application No. PCT/US2015/014528, May 19, 2016, WIPO, 8 Pages.

\* cited by examiner

COMPUTING APPLICATION INSTANT REPLAY

BACKGROUND

When viewers watch live video broadcasts, events may occur that may be of particular interest to the viewers. Such events, having already been broadcast live, may be replayed during the live broadcast shortly after the live occurrence in order for the viewers to analyze and enjoy again what has already taken place. Similarly, when users are playing video games, events may occur during live gameplay that are of particular interest to the users, and the users may desire to view such events after they occur.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to providing video game instant replays are disclosed. In one embodiment, a currently playing video game is overseen by a platform-level instant replay companion that executes separately from any of a plurality of different video games. A most recently played portion of rendered gameplay from the currently playing video game is automatically and continuously recorded with the platform-level instant replay companion. A recorded gameplay segment from the most recently played portion of rendered gameplay is displayed with the platform-level instant replay companion.

DETAILED DESCRIPTION

This description relates to providing instant replay functionality for any video game at a platform level of a computer gaming device. More particularly, this description relates to displaying a recorded gameplay segment from a most recently played portion of rendered gameplay. For example, the recorded gameplay segment may be displayed with a platform-level instant replay companion that is executed separate from any particular video game of the computer gaming device. Accordingly, the recorded gameplay segment may be viewed through a common platform controlled experience.

Figure 1:
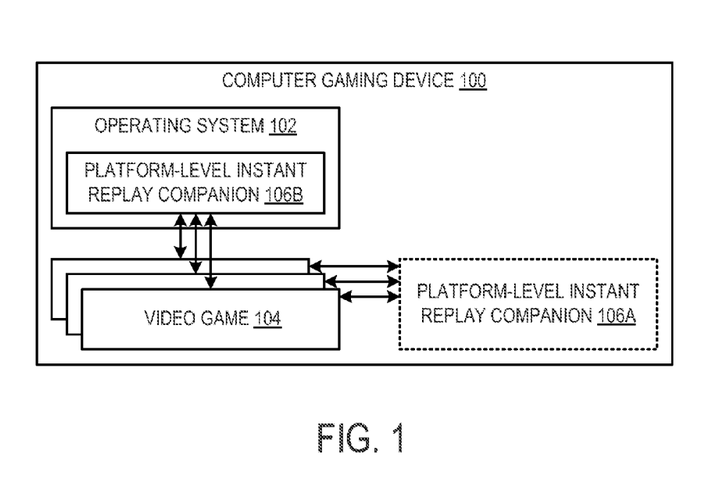
FIG. 1 schematically shows a computer gaming device according to an embodiment of this disclosure.

FIG. 1 schematically shows a computer gaming device 100 according to an embodiment of this disclosure. The computer gaming device 100 is shown in simplified form. The computer gaming device 100 may take any suitable form including a game console, entertainment computing device, portable gaming device, tablet, laptop, desktop, smartphone, virtual- or augmented-reality device, or other computing device that may be used to play a video game.

The computer gaming device 100 includes an operating system 102 configured to manage hardware resources of the computer gaming device. Further, the operating system 102 may be configured to monitor, oversee, or otherwise manage operation of various software programs, services, and applications running on the computer gaming device 100. For example, a video game 104 may be executed or played on the computer gaming device and the operating system may manage operation of the video game. The video game 104 may be one of a plurality of different video games that the computer gaming device is configured to play.

Furthermore, a platform-level instant replay companion 106A and/or platform-level instant replay companion 106B may be executed on the computer gaming device. In particular, the platform-level instant replay companion may be executed separately from the video game 104 and any other video games of the plurality of different video games configured to be played on the computer gaming device 100. In one example, a platform-level replay companion 106A is an application that runs while the video game is being played. In another example, a platform-level instant replay companion 106B is a part of the operating system.

The platform-level instant replay companion may be configured to oversee any currently playing video game on the computer gaming device 100 and provide instant replay functionality for that currently playing video game. In particular, since the instant replay companion is executed at the platform level and not within any particular video game, the instant replay functionality provided by the instant replay companion may be the same for every video game played on the computer gaming device. Moreover, video games that are compatible with the computer gaming device may be made less complex relative to video games with built-in game specific instant replay functionality. Game developers need not design game-specific instant replay experiences. Rather, every video game may interface with the platform-level instant replay companion for instant replay functionality without additional effort from the developer. Such instant replay functionality will be discussed in further detail below with reference to an instant replay method 300 shown in FIG. 3.

Figure 2:
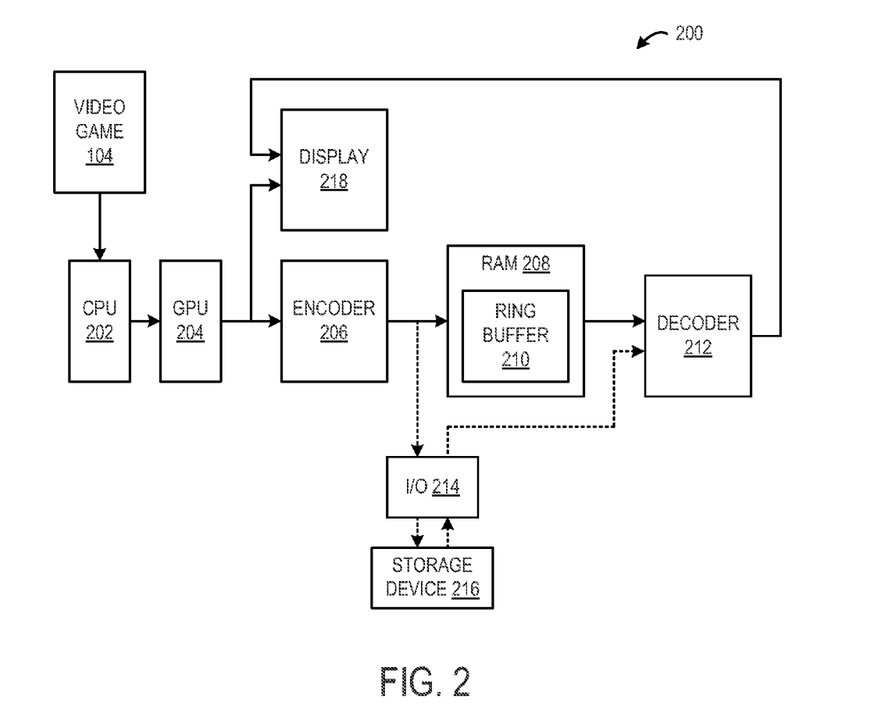
FIG. 2 schematically shows a graphics pipeline of a computing device according to an embodiment of this disclosure.

FIG. 2 schematically shows a graphics pipeline 200 according to an embodiment of this disclosure. The graphics pipeline may be implemented in the computer gaming device 100 shown in FIG. 1, or various stages of the graphics pipeline may be distributed throughout two or more different computing devices (e.g., a local gaming machine and a remote computing system running a gaming service). The graphics pipeline 200 enables platform-level instant replay functionality.

The graphics pipeline 200 comprises one or more central processing units (CPU) 202, one or more graphics processing units (GPU) 204, an encoder 206, a random access memory (RAM) device 208 including a ring buffer 210, a decoder 212, an input/output interface device 214, a storage device 216, and a display 218. It will be understood that the graphics pipeline may include additional and/or alternative processing logic and other hardware blocks without departing from the scope of this disclosure.

In one example, the CPU 202 fetches game instructions from the video game 104. The CPU 202 decodes the instructions into game data including drawing instructions for rendering video imagery of gameplay of the video game 104. The CPU 202 passes the drawing instructions and other game data to the GPU 204. The GPU 204 executes the drawing instructions to produce rendered image frames of the video game 104 (also referred to as rendered gameplay data). For example, the image frames output from the GPU 204 may be raw or uncompressed image data (e.g., every pixel in an image frame has full color definition). The GPU 204 sends the rendered gameplay data for display on the display 218.

Additionally, the GPU 204 sends the raw image frames of the rendered gameplay to the encoder 206 to be compressed or otherwise encoded. For example, the raw image frames may be encoded into MPEG-4, H.264, or another suitable image format. The encoder 206 sends the encoded rendered gameplay data to the RAM device 208 for recording in the ring buffer 210. The RAM device 208 may include any suitable type of memory including SDRAM (e.g., DDR, GDDR, etc.). Moreover, the RAM device 208 may be any suitable size.

In some embodiments, the CPU and the GPU may be combined in a single package. In some embodiments, the CPU or the GPU may be omitted. In some embodiments, the RAM device may be integrated with the CPU and/or GPU in a system-on-chip (SOC) configuration.

The ring buffer 210 may be automatically and continuously loaded with rendered gameplay data from the encoder 206 until filled. Once the ring buffer 210 is filled, an oldest portion of rendered gameplay data may be overwritten with new rendered gameplay data. Accordingly, a most recently played portion of rendered gameplay from a currently playing video game may be automatically recorded in the ring buffer 210 in a continuous fashion. The ring buffer 210 may be any suitable size. In one example, the ring buffer 210 has a capacity of five minutes worth of rendered gameplay data. In other words, the ring buffer continuously records the most recent five minutes of gameplay of the currently playing video game.

It will be understood that the ring buffer is merely one example of a storage mechanism, and the rendered gameplay data may be stored in the RAM device in any suitable fashion. For example, the rendered gameplay may be recorded in any suitable storage mechanism that abides by the first-in-first-out (FIFO) principle.

When an instant replay is requested during gameplay of the currently playing video game, a recorded gameplay segment from the most recently played portion of rendered gameplay stored in the ring buffer 210 may be sent to the decoder 212.

It will be understood that the recorded gameplay segment may include any suitable amount of the rendered gameplay data stored in the ring buffer. For example, the recorded gameplay segment may include some or all of the rendered gameplay data stored in the ring buffer. In one example, a default length of the recorded gameplay segment is thirty seconds. In some embodiments, a length of the recorded gameplay segment used for instant replay may be adjusted via the platform-level instant replay companion. In some embodiments, a length of the recorded gameplay segment used for instant replay may be adjusted on a per video game basis, for example according to a parameter specified by the video game via an application programming interface (API).

The decoder 212 decodes the encoded rendered gameplay data of the recorded gameplay segment into raw gameplay data and sends the raw rendered gameplay data directly to the display 218. The display 218 displays the recorded gameplay segment. In some embodiments, the recorded gameplay segment is displayed while a game state of the currently playing video game is displayed. In particular, the GPU 204 continues to send current rendered gameplay data to the display 218 during the instant replay. It will be understood that the rendered game state of the currently playing video game can be combined with the recorded gameplay segment in any suitable manner and/or according to any suitable visual layout.

In some cases, the game state includes a paused game state, and in other cases the game state includes a current active game state. For example, in a single player video game scenario, the game state may be paused during the instant replay. In this scenario, a static image of a virtual scene of the currently playing video game may be displayed while the instant replay of the recorded gameplay segment is displayed. In other words, in the paused state, a game state of the currently playing video game may not change while the recorded gameplay segment is displayed. In another example, in a multiplayer video game scenario, the game state may be a current active game state where other players continue to play the video game during the instant replay. In this scenario, video images of a current state of a virtual scene of the currently playing video game may be displayed while the instant replay of the recorded gameplay segment is displayed. For example, virtual characters may move and perform various actions within the virtual scene according to the current game state. In other words, in the current active game state, a game state of the currently playing video game may change while the recorded gameplay segment is displayed.

It will be understood that because the gameplay data that is recorded to the ring buffer is rendered by the GPU prior to being recorded, the recorded rendered gameplay segment may be displayed directly from the ring buffer without having to be reprocessed by the GPU. Such an approach facilitates display of an instant replay on demand with little or no lag time. On the other hand, if game data that is not rendered is recorded to the ring buffer, then the game data would have to be rendered by the GPU before being displayed, which may slow down the replay process.

In some embodiments, the encoder 206 and the decoder 212 may be incorporated with the RAM device 208, and the GPU 204 sends the raw rendered gameplay data directly to the RAM device. Correspondingly, in such embodiments, the RAM device 208 sends a recorded gameplay segment directly to the display 218 for instant replay.

In some embodiments, the encoder 206 selectively sends the encoded rendered gameplay data to the storage device 216 for long term storage, such as in the case of a video game digital video recorder (DVR). For example, the rendered gameplay data may be sent to the storage device 216 in response to user selection of a particular gameplay segment of the currently playing video game that the user desires to view again at a later time. In another example, the video game may automatically select a particular gameplay segment for storage in the storage device 216. For example, a gameplay segment may be automatically selected for storage in a video game DVR responsive to a user achieving a new high score, accomplishing a game-determined feat (e.g., defeating AI boss, defeating multi-player opponent, encountering multi-player friend, etc.), or otherwise having an in-game experience that the video game deems worthy.

For storage of rendered gameplay data, the encoder 206 sends the encoded rendered gameplay data to the input/output interface device 214, and the input/output interface device 214 performs a write operation to write the encoded rendered gameplay data to the storage device 216. Correspondingly, for retrieval of rendered gameplay data, the input/output interface device 214 performs a read operation on the storage device 216 to retrieve the encoded rendered gameplay data. It will be understood that the storage device may take any suitable form including a hard disk drive, solid state drive, a combination thereof, or another storage technology.

In some embodiments, the encoder 206 and the decoder 212 may be incorporated with the RAM device 208 or otherwise bypassed, and the GPU 204 may send the raw rendered gameplay data directly to the input/output interface device 214 for storage on the storage device 216. Correspondingly, in such embodiments, the input/output interface device 214 sends a recorded gameplay segment directly to the display 218 for replay.

It is to be understood that by automatically and continuously recording the rendered gameplay of the currently playing video game to the RAM device, the most recently played portion of rendered gameplay from the currently playing video game may be available on demand for display. In particular, since the rendered gameplay may be displayed directly from the RAM device without any additional read/write operations, the rendered gameplay may be displayed with little or no lag time. In contrast, when rendered gameplay is recorded to a video game DVR, a write operation is performed to store the rendered game data on the storage device. Moreover, in order to display the rendered game data, the rendered game data is retrieved from the hard drive via a read operation. The video game DVR may be suitable for archiving and subsequent playback of gameplay at a later time. However, the write operation, the read operation, and the relatively slower storage technology (e.g., a hard disk drive) collectively take more time to store/retrieve rendered gameplay data than is suitable to provide instant replay during gameplay of a currently playing video game.

Figure 3:
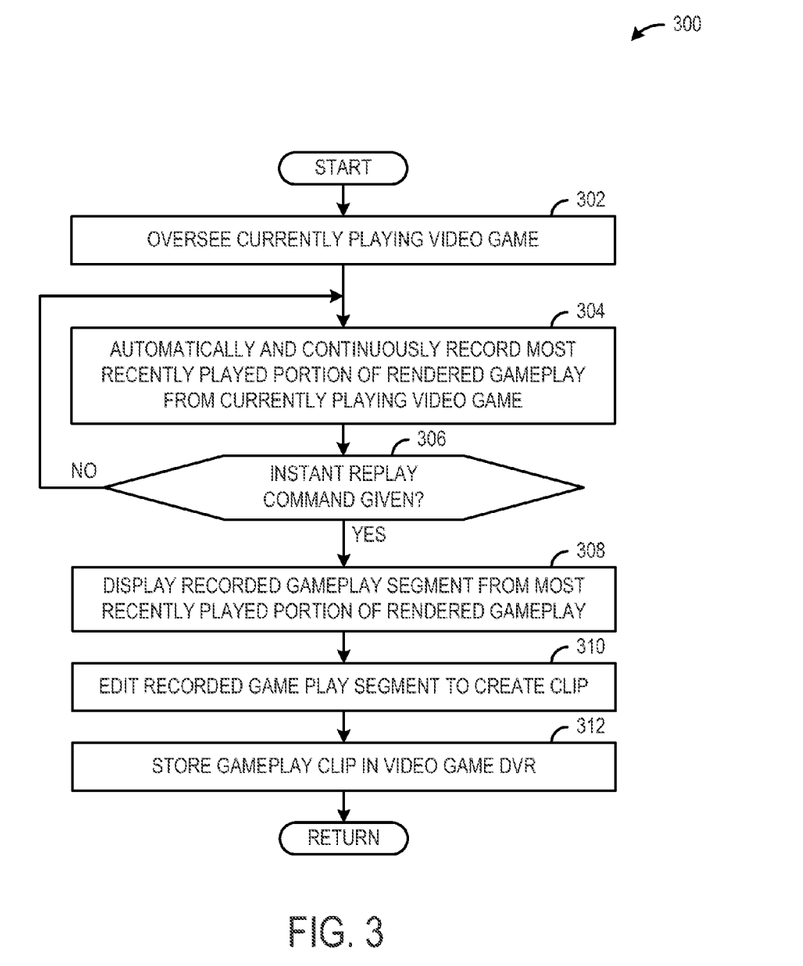
FIG. 3 shows an instant replay method for video games according to an embodiment of this disclosure.

FIG. 3 shows an instant replay method 300 for video games according to an embodiment of this disclosure. For example, the instant replay method 300 may be performed with the platform-level instant replay companion of the computer gaming device 100 shown in FIG. 1.

At 302, the method 300 may include overseeing a currently playing video game. For example, the platform-level instant replay companion may monitor game events to recognize when an instant replay is to be displayed.

At 304, the method 300 may include automatically and continuously recording a most recently played portion of rendered gameplay from the currently playing video game. For example, rendered image frames may be continuously encoded and stored in a ring buffer of a RAM device while the currently playing video game is being played.

At 306, the method 300 may include determining whether an instant replay command is given. In some cases, the instant replay command may be given by the video game. In some cases, the instant replay command may be given via user input. If it is determined that an instant replay command is given, then the method 300 moves to 308. Otherwise, the method 300 returns to 304.

At 308, the method 300 may include displaying a recorded gameplay segment from the most recently played portion of rendered gameplay. In some embodiments, the recorded gameplay segment may be displayed while a game state of the currently playing video game is displayed. In some embodiments, the recorded gameplay segment may be displayed directly from the ring buffer of the RAM device.

It will be understood that the recorded gameplay segment may be displayed repeatedly without departing from the scope of this disclosure. Accordingly, the user may analyze and enjoy the recorded gameplay segment over and over again as desired.

Optionally, at 310, the method 300 may include editing the recorded gameplay segment to create a gameplay clip. For example, a start time, a stop time, and a length of the recorded gameplay segment may be specified by the user via transport controls provided by the platform-level instant replay companion. It will be understood that the platform-level instant replay companion may provide any suitable transport or editing controls for editing the recorded gameplay segment.

Optionally, at 312, the method 300 may include storing the gameplay clip in a video game DVR. For example, a portion of a hard disk drive may be allocated for the video game DVR, and the gameplay clip may be written to the hard disk drive for long term storage and playback at a later time. Further, in some embodiments, the gameplay clip may be sent to a remote computing machine via a service for sharing the gameplay clip with other users.

The above described method facilitates instant replay of any currently playing video game playing on a computer gaming device. In particular, because the method is performed with the platform-level instant replay companion, the instant replay functionality works for any video game that is compatible with the computer gaming device. Moreover, the instant replay experience is the same for any of the video games. For example, instant replays displayed with the platform-level instant replay companion may have the same visual appearance and transport controls. Furthermore, by recording rendered gameplay to a RAM device and displaying the rendered gameplay directly from the RAM device, recorded gameplay may be displayed on demand without any noticeable lag or load time.

Figure 4:
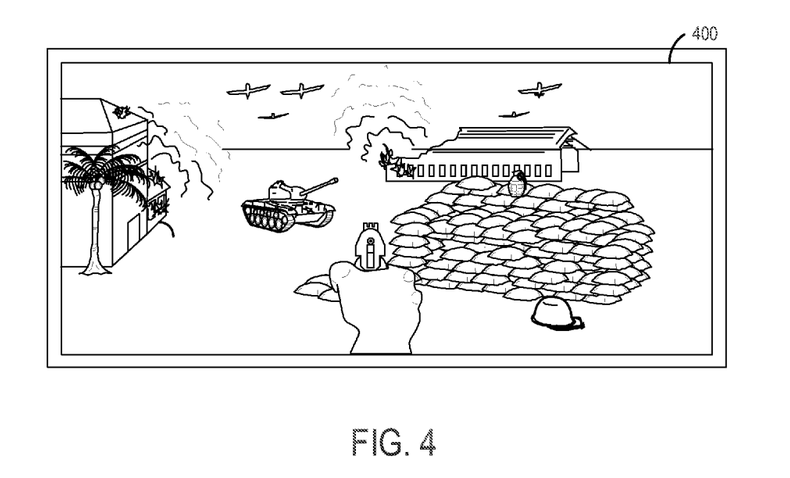
FIG. 4 shows an example of a current portion of rendered gameplay from a currently playing video game.

FIG. 4 shows an example of a current portion 400 of rendered gameplay from a currently playing video game. In this example, the currently playing video game is a first-person-shooter style game in which gameplay is displayed from a first person perspective. The first person perspective is centered on a hand of a protagonist holding a gun. In particular, the current portion of rendered gameplay shows a scene where a squadron of airplanes has dropped bombs on a series of buildings causing destruction of the buildings. Furthermore, a tank is moving in between the buildings.

Figure 5:
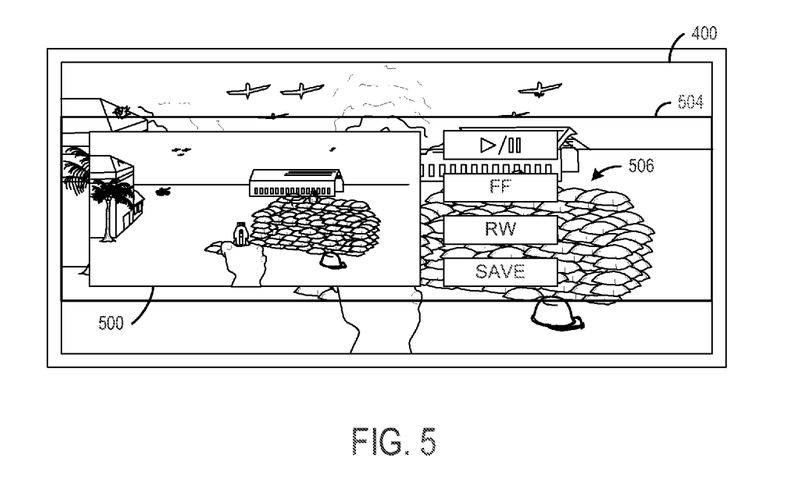
FIG. 5 shows an example of a recorded gameplay segment being displayed in an overlay with a game state of a currently playing video game.
Figure 6:
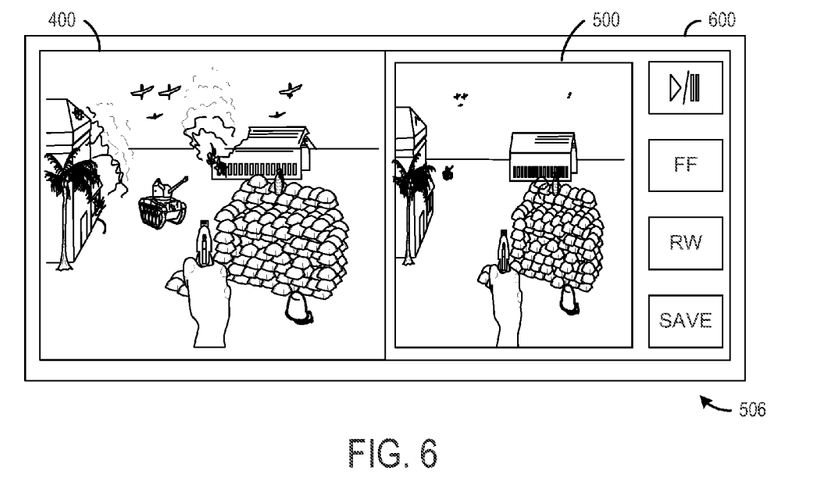
FIG. 6 shows an example of a recorded gameplay segment being displayed side-by-side with a game state of a currently playing video game.

FIGS. 5 and 6 show different embodiments of an instant replay of a recorded gameplay segment of the currently playing video game. FIG. 5 shows an example of a recorded gameplay segment 500 being displayed in an overlay 504. The recorded gameplay segment 500 shows a portion of rendered gameplay that is earlier than and leads up to the current portion 400 of rendered gameplay. In particular, the buildings have not yet been destroyed, and the squadron of airplanes and the tank are far-off in the distance.

The overlay 504 is displayed in front of the current portion 400 of the currently playing video game. In some embodiments, the overlay partially obstructs a game state of the currently playing video game, but the game state is still visible to the user. In other embodiments, the overlay may completely obstruct the game state of the currently playing video game.

In some cases, when the recorded gameplay segment 500 is displayed, the game state of the currently playing video game is a paused state. For example, in a single player video game scenario, the game state may be paused while the instant replay is displayed. In other cases, when the recorded gameplay segment 500 is displayed, the game state of the currently playing video game is a current active game state (e.g., the video game continues playing). For example, in a multiplayer video game scenario, the game state may be a current active game state where other players continue to play the video game while the instant replay is displayed.

The overlay includes transport controls 506 to control playback of the recorded gameplay segment 500. The transport controls include a play/pause button, a fast forward button, a rewind button, and a save button. The play/pause button starts/stops playback of the recorded gameplay segment. The fast forward button moves forward in the recorded gameplay segment at a speed other than the normal playback speed. The rewind button moves backward in the recorded gameplay segment at a speed other than the normal playback speed. Note that in some cases the rewind button may move beyond a default starting point in the recorded gameplay segment to an earlier portion of rendered gameplay. This may be possible if the recorded gameplay segment is smaller than a most recently played portion of rendered gameplay stored in the ring buffer. The save button saves the recorded gameplay segment as a gameplay clip in a video game DVR for playback at a later time when the currently playing video game is not being played.

It will be understood that the transport controls may include any suitable control to navigate throughout the recorded gameplay segment and/or a most recently played portion of rendered gameplay. In some embodiments, the transport controls include editing controls to change the recorded gameplay segment for saving as a gameplay clip in the video game DVR. For example, such controls may adjust a start time, a stop time, and a length of the recorded gameplay segment.

FIG. 6 shows an example of the recorded gameplay segment 500 being displayed with the current portion 400 of the currently playing video game in a side-by-side layout 600. The side-by-side layout 600 allows the current portion 400 of rendered gameplay to be viewed without obstruction while the recorded gameplay segment 500 is displayed. The transport controls 506 are provided to control playback of the recorded gameplay segment 500. It will be understood that the current portion 400 of rendered gameplay and the recorded gameplay segment 500 may be displayed simultaneously according to any suitable layout. For example, the current and recorded gameplay may be displayed in an over-under layout.

Figure 7:
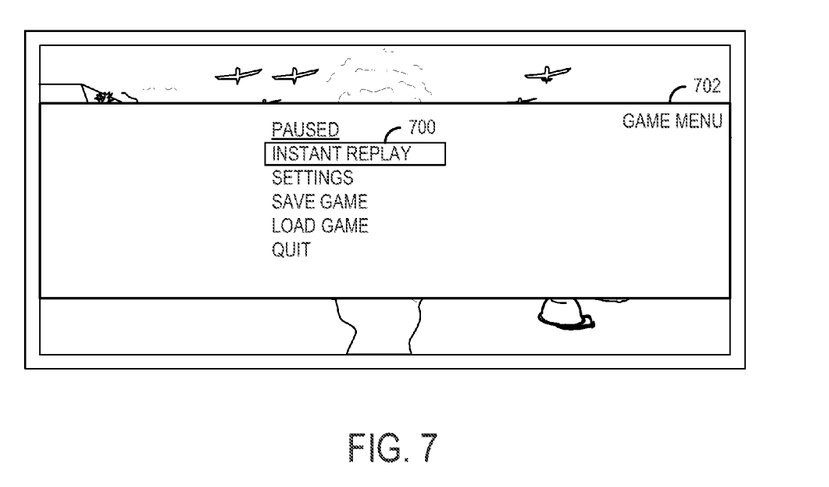
FIGS. 7-10 show examples of different user initiated instant replay commands that trigger display of a recorded gameplay segment.

FIGS. 7-10 show examples of different user initiated instant replay commands that trigger display of a recorded gameplay segment. FIG. 7 shows an instant replay function 700 embedded in a video game menu 702 of a currently playing video game. In particular, the instant replay function 700 may be selected from among the other options in the game menu 702 by a user to display an instant replay of a recorded gameplay segment. Although the instant replay function is embedded in the game menu of the video game, the instant replay may be provided by the platform-level instant replay companion. In particular, the platform-level instant replay companion may include an instant replay application programming interface (API) that enables the instant replay function to be embedded in the video game menu of the currently playing video game or otherwise allows a game-specific menu to utilize the instant replay companion.

Figure 8:
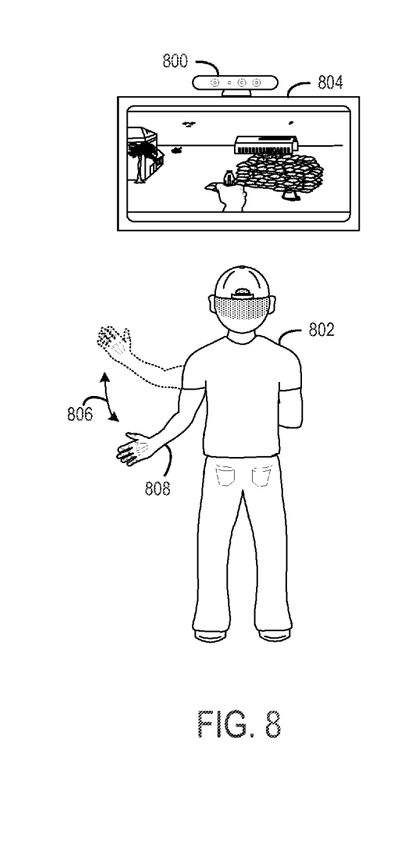
Figure 9:
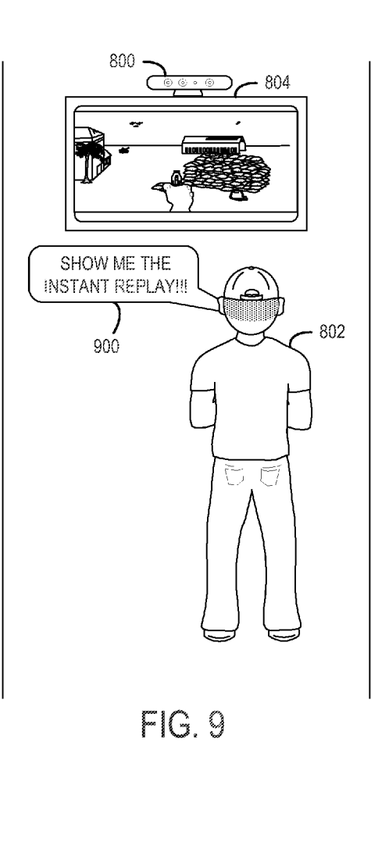

FIGS. 8 and 9 show an example scenario where a natural user input (NUI) interface system 800 monitors an environment including a human subject 802. The NUI interface system is positioned above a display 804. The NUI interface system 800 and the display 804 are operatively coupled with a computer gaming device (not shown). The NUI interface system 800 may be configured to image the environment as well as detect audio in the environment.

FIG. 8 shows an example scenario where the human subject 802 performs a waving gesture 806 with his arm 808. The waving gesture 806 may be recognized by the NUI interface system 800 as a command that triggers display of an instant replay of a currently playing video game. The NUI interface system 800 sends an indication of the gesture to the platform-level instant replay companion. In response to receiving the indication, the platform-level instant replay companion displays the recorded gameplay segment on the display 804.

FIG. 9 shows an example scenario where the human subject 802 speaks a phrase 900 (e.g., "SHOW ME THAT INSTANT REPLAY!!!"). The spoken phrase may be recognized by the NUI interface system 800 as a voice command that triggers display of an instant replay of a currently playing video game. The NUI interface system 800 sends an indication of the command to the platform-level instant replay companion. In response to receiving the indication, the platform-level instant replay companion displays the recorded gameplay segment on the display 804.

Figure 10:
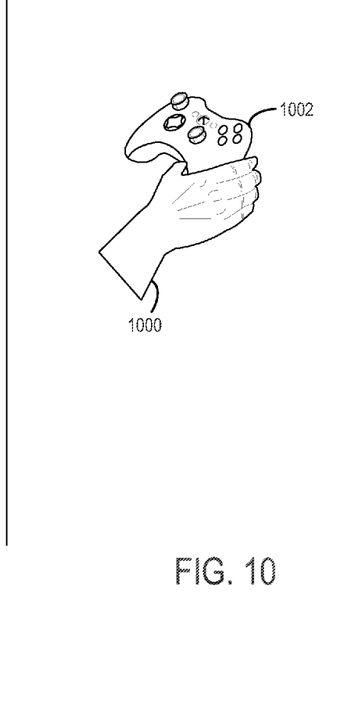

FIG. 10 shows a scenario where a hand 1000 of a user is holding a gamepad controller 1002. The gamepad controller 1002 may be operatively coupled with the computer gaming device (not shown). The user may provide input to the gamepad controller 1002 that indicates an instant replay command. The gamepad controller 1002 sends an indication of the command to the platform-level instant replay companion. In response to receiving the indication, the platform-level instant replay companion displays the recorded gameplay segment on the display. For example, the user input may include a particular combination of buttons to trigger the instant replay. In some embodiments, the combination of buttons may be the same for any of the different video games.

In some embodiments, a companion computing device may be used to trigger display of an instant replay via the platform-level instant replay companion. A companion computing device may be used in conjunction with a computer gaming device to provide a secondary gaming experience that enhances gameplay of a video game. Non-limiting examples of a companion computing device include a portable gaming device, a mobile computing device, a smartphone, etc. In one example, the user provides input to the companion computing device that indicates an instant replay command. The instant replay command is sent from the companion computing device to the platform-level instant replay companion on the computer gaming device. In response to receiving the command, the platform-level instant replay companion displays the recorded gameplay segment on the display. In another example, the user provides input to the companion computing device that indicates an instant replay command. The instant replay command is sent from the companion computing device to the platform-level instant replay companion on the computer gaming device. In response to receiving the command, the platform-level instant replay companion commands the companion computing device to display the recorded gameplay segment on a display of the companion computing device. In some cases, the instant replay may be displayed on the companion computing device while a current gameplay state is displayed on the primary display.

Note that the above described scenarios may be used to trigger display of an instant replay, and such scenarios may be similarly used to stop display of the instant replay. In some cases, the instant replay may be stopped or returned to the current game state without user action once the recorded gameplay segment has ended.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
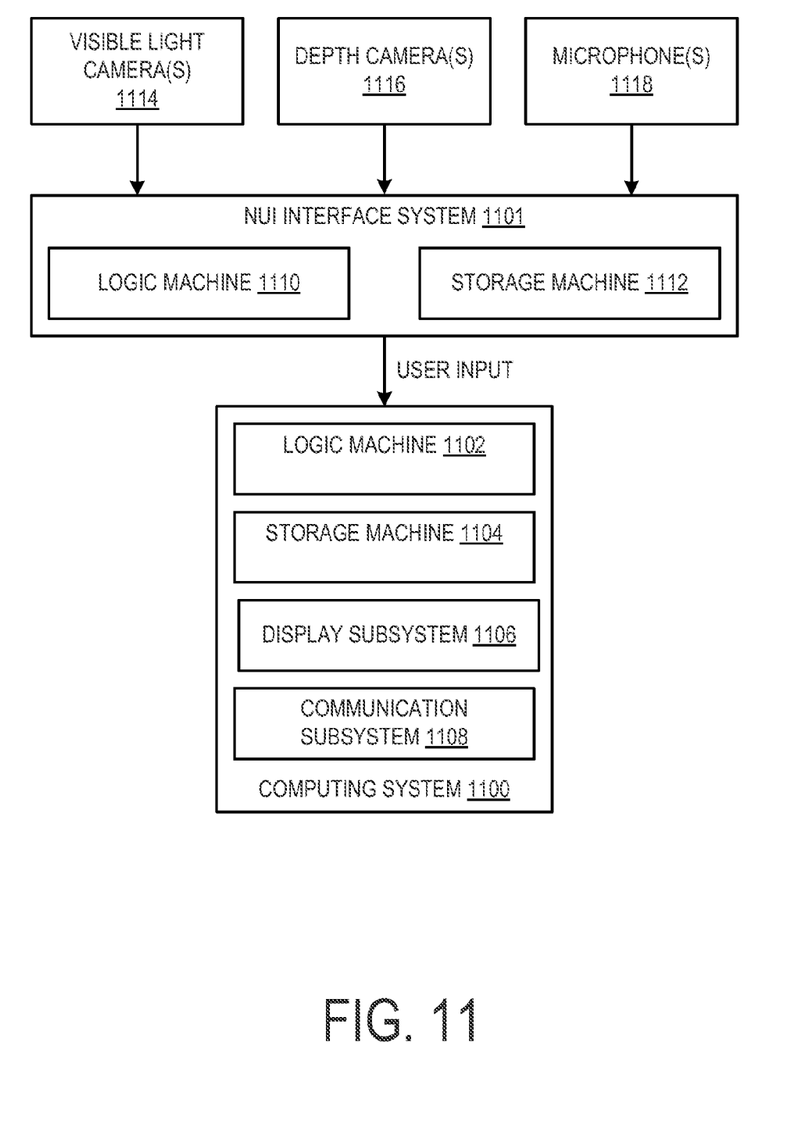
FIG. 11 shows a computing system and a natural user interface (NUI) interface system according to an embodiment of this disclosure.

FIG. 11 schematically shows a non-limiting embodiment of a computing system 1100 that can enact one or more of the methods and processes described above. Computing system 1100 is shown in simplified form. Computing system 1100 may take the form of one or more console game systems, personal computers, server computers, tablet computers, home-entertainment computers, network computing devices, gaming devices, mobile computing devices, mobile communication devices (e.g., smart phone), and/or other computing devices. For example, computing system 1100 may take the form of computer gaming device 100 shown in FIG. 1.

Computing system 1100 includes a logic machine 1102 and a storage machine 1104. Computing system 1100 may optionally include a display subsystem 1106, a communication subsystem 1108, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. For example, the platform-level instant replay companion may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, communication subsystem 1108 may be configured to communicatively couple computing system 1100 with one or more other computing devices. Communication subsystem 1108 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

As noted above, an NUI interface system 1101 may be configured to provide user input to computing system 1100. To this end, the NUI interface system includes a logic machine 1110 and a storage machine 1112. To detect the user input, the NUI interface system receives low-level input (i.e., signal) from an array of sensory components, which may include one or more visible light cameras 1114, depth cameras 1116, and microphones 1118. Other example NUI componentry may include one or more infrared or stereoscopic cameras; a head tracker, eye tracker, accelerometer, and/or gyroscope for motion detection and/or intent recognition; as well as electric-field sensing componentry for assessing brain activity. In some embodiments, the NUI interface system may comprise or interface with one or more user-input devices such as a keyboard, mouse, touch screen, or game controller.

The NUI interface system processes the low-level input from the sensory components to yield an actionable, high-level input to computing system 1100. Such action may generate corresponding text-based user input or other high-level commands, which are received in computing system 1100. In some embodiments, NUI interface system and sensory componentry may be integrated together, at least in part. In other embodiments, the NUI interface system may be integrated with the computing system and receive low-level input from peripheral sensory components.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An instant replay method for video games, the method comprising:
   on a computer gaming device configured to play a plurality of different video games, overseeing a currently playing video game of the plurality of different video games with a platform-level instant replay companion that executes separately from any of the plurality of different video games;
   with the platform-level instant replay companion, automatically and continuously recording a most recently played portion of rendered gameplay from the currently playing video game;
   recognizing a user-initiated instant replay command provided by a video game player via one or more of a handheld game controller, a touch screen, a camera, and a microphone; and
   with the platform-level instant replay companion, displaying a recorded gameplay segment from the most recently played portion of rendered gameplay while a game state of the currently playing video game is displayed.

2. The method of claim 1, wherein the most recently played portion of rendered gameplay is recorded from the currently playing video game into a ring buffer of a random access memory device, and wherein the recorded gameplay segment is displayed directly from the ring buffer of the random access memory device.

3. The method of claim 1, wherein the recorded gameplay segment is displayed in an overlay that partially obstructs the game state of the currently playing video game.

4. The method of claim 1, wherein the recorded gameplay segment is displayed with the game state of the currently playing video game in a side-by-side layout.

5. The method of claim 1, wherein the game state of the currently playing video game is selected from a paused game state and a current active game state.

6. The method of claim 1, wherein the game state of the currently playing video game is more recent than a recorded game state of the recorded gameplay segment.

7. The method of claim 1, wherein the platform-level instant replay companion includes an instant replay application programming interface (API) that enables an instant replay function to be embedded in a video game menu of the currently playing video game, and wherein the recorded gameplay segment is displayed in response to selection of the instant replay function.

8. The method of claim 1, wherein the platform-level instant replay companion provides transport controls to control playback of the recorded gameplay segment.

9. The method of claim 1, wherein the platform-level instant replay companion provides instant replay functionality for all of the plurality of different video games.

10. An instant replay method for video games, the method comprising:
    on a computer gaming device configured to play a plurality of different video games, overseeing a currently playing video game of the plurality of different video games with a platform-level instant replay companion that executes separately from any of the plurality of different video games;
    with the platform-level instant replay companion, automatically and continuously recording a most recently played portion of rendered gameplay from the currently playing video game into a ring buffer of a random access memory device; and
    with the platform-level instant replay companion, displaying from the ring buffer of the random access memory device a recorded gameplay segment from the most recently played portion of rendered gameplay.

11. The method of claim 10, wherein the recorded gameplay segment is displayed in an overlay that partially obstructs a game state of the currently playing video game.

12. The method of claim 10, wherein the recorded gameplay segment is displayed with a game state of the currently playing video game in a side-by-side layout.

13. The method of claim 10, wherein the recorded gameplay segment is displayed while a game state of the currently playing video game is displayed, and wherein the game state of the currently playing video game is selected from a paused game state and a current active game state.

14. The method of claim 10, wherein the recorded gameplay segment is displayed in response to recognition of a user initiated instant replay command selected from a voice command, user input to a peripheral device, and a gesture.

15. The method of claim 10, wherein the platform-level instant replay companion includes an instant replay application programming interface (API) that enables an instant replay function to be embedded in a video game menu of the currently playing video game, and wherein the recorded gameplay segment is displayed in response to selection of the instant replay function.

16. The method of claim 10, wherein the platform-level instant replay companion provides transport controls to control playback of the recorded gameplay segment.

17. A storage machine holding instructions executable by a logic machine to instantiate a platform-level instant replay companion that executes separately from any of a plurality of different video games, the platform-level instant replay companion configured to:
- oversee a currently playing video game of the plurality of different video games;
- automatically and continuously record into a ring buffer of a random access memory device a most recently played portion of rendered gameplay from the currently playing video game; and
- display from the ring buffer of the random access memory device a recorded gameplay segment from the most recently played portion of rendered gameplay while a game state of the currently playing video game is displayed.

18. The storage machine of claim 17, wherein the recorded gameplay segment is displayed in an overlay that partially obstructs the game state of the currently playing video game.

19. The storage machine of claim 17, wherein the platform-level instant replay companion includes transport controls to control playback of the recorded gameplay segment.

* * * * *